United States Patent [19]

Buller-Colthurst

[11] Patent Number: 4,644,857
[45] Date of Patent: Feb. 24, 1987

[54] FOOD PROCESSING CHAMBER

[76] Inventor: Guy E. Buller-Colthurst, 3 Dundas Street East, Erin, Ontario, Canada

[21] Appl. No.: 780,835

[22] Filed: Sep. 27, 1985

[51] Int. Cl.$^4$ ............................................. A47J 37/00
[52] U.S. Cl. ........................................ 99/335; 99/352; 99/443 C; 99/447; 99/477; 198/742; 426/523
[58] Field of Search ................. 99/325, 334, 335, 337, 99/427, 443 C, 447, 330, 352, 360, 361, 404, 410, 411, 477; 198/742; 426/520, 523, 315; 17/44.4

[56] References Cited

U.S. PATENT DOCUMENTS

| | | | |
|---|---|---|---|
| 1,581,519 | 4/1926 | Robertson | 426/315 |
| 1,960,516 | 5/1934 | Taylor | 426/315 |
| 3,062,353 | 11/1962 | Opperthauser | 198/742 X |
| 3,276,352 | 10/1966 | Allen | 99/325 X |
| 3,301,374 | 1/1967 | Proctor | 198/742 |
| 3,343,477 | 9/1967 | Ekstam | 99/477 X |
| 3,518,934 | 7/1970 | Davis | 99/443 C |
| 3,702,583 | 11/1972 | Rullman | 99/443 C X |
| 3,718,082 | 2/1973 | Lipoma | 99/470 |
| 3,792,508 | 2/1974 | Simonsen et al. | 17/44.4 |
| 3,948,158 | 4/1976 | Borsuk | 99/443 C X |
| 3,982,300 | 9/1976 | Soikie et al. | 17/44.4 |
| 4,081,564 | 3/1978 | Borsuk | 99/443 C X |
| 4,136,608 | 1/1979 | Gladd | 99/335 X |
| 4,250,917 | 2/1981 | Jespersen et al. | 137/563 |
| 4,252,055 | 2/1981 | Johansson | 99/447 X |
| 4,271,957 | 6/1981 | Osborne | 198/742 X |
| 4,310,020 | 1/1982 | Jespersen et al. | 137/563 |
| 4,366,177 | 12/1982 | Wells et al. | 426/523 |

Primary Examiner—Billy J. Wilhite
Attorney, Agent, or Firm—George A. Rolston

[57] ABSTRACT

A processing chamber for processing products and having different processing conditions in different chamber zones, a single continuous conveyor extending through the chamber from one end to the other, unit supports supportable on the conveyor for moving units from one end to the other, a first unit movement system to move units through the chamber at a predetermined first speed, a second unit movement system for moving units through the chamber at a predetermined second speed, engagement devices interengageable between the unit supports and the first movement system, or the second movement system, selectively, and a control to control the first and second movement system for selective timed operation.

8 Claims, 6 Drawing Figures

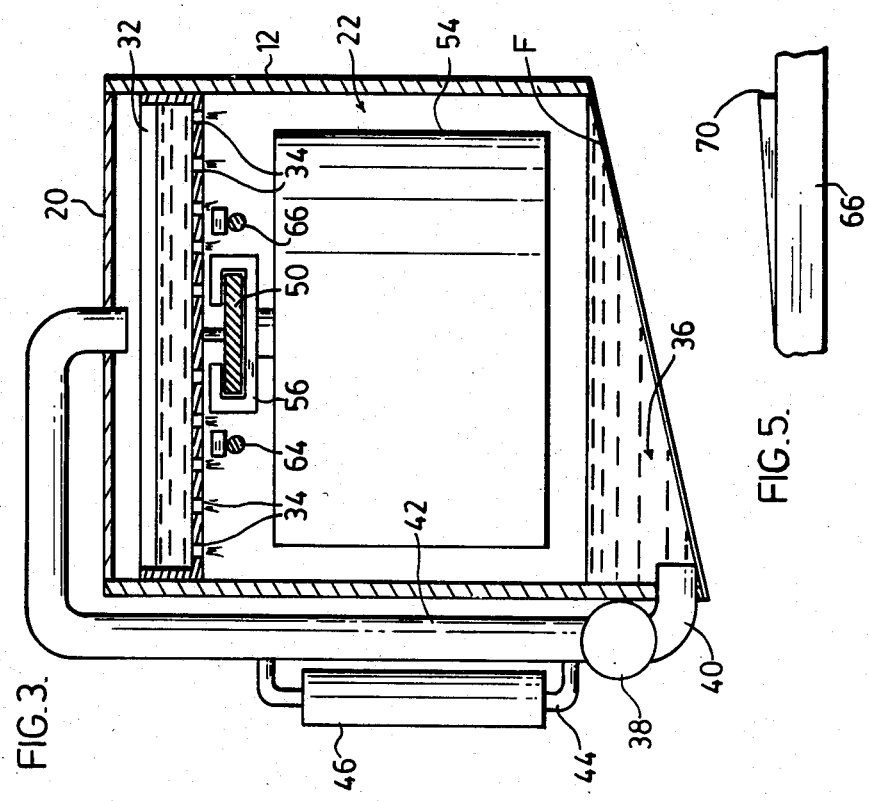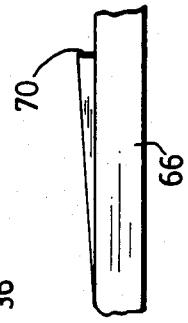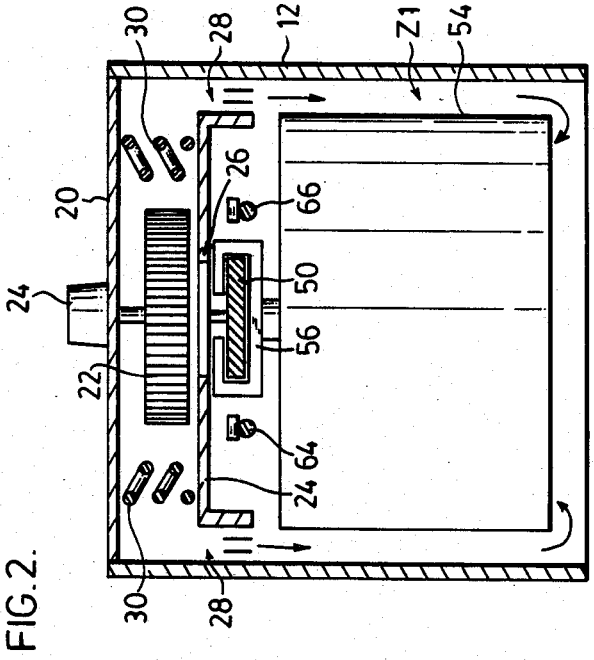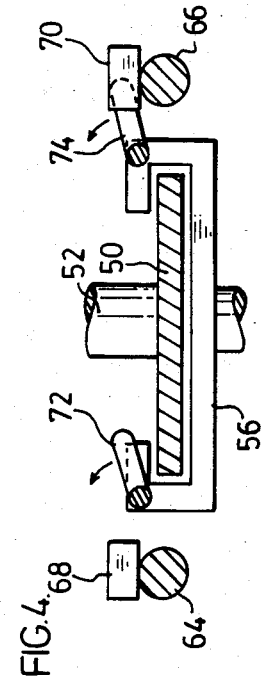

FOOD PROCESSING CHAMBER

The invention relates to a processing chamber for processing batches of products, by subjecting the same to conditions established in said chamber, and in particular to such a chamber where different batches of products are processed for different lengths of time.

BACKGROUND OF THE INVENTION

Processing chambers are known for processing food products, pottery, metal products, and the like under conditions established in such a chamber. Conveyors are used for conveying such products either continuously or in batches through such chambers. In many cases, it is desirable to establish a chamber with a series of different zones, in which different conditions exist.

This is particularly desirable in the processing of food products such as meat, poultry, and processed meat such as hams, picnics, pork bellies, luncheon meats and sausage.

In these cases, different zones may provide for air circulation, or water shower or water spray treatments. The air may be either at an elevated temperature or contain smoke or other treatments, or may be at reduced temperature for chilling. Similarly, the water shower may be at an elevated temperature for cooking, or at reduced temperature for chilling.

The atmosphere in the chamber may be tempered or modified by regulating the humidity, or by adding artificial smoke.

In the past, it has been usual to provide such chambers in which the products were moved gradually and progressively and continuously through the various zones in the chamber by a continuously moving conveyor.

In these cases, however, it was necessary to operate the chamber at preset conditions in the various zones, and since the conveyor was moving continuously through all the zones at the same speed, it was only possible to process one type of product at any given time.

In order to change products, it was necessary for the product already in the chamber to be completely processed all the way through which might take several hours, and then, when the chamber was empty, the conditions could be changed, or the speed of the conveyor could be changed, to suit a different product.

This type of installation involved a very substantial investment in capital. It was therefore suitable only for processing products in very large volumes.

It also produced a considerable degree of inflexibility in the use of the equipment. Clearly, it is desirable to provide a processing chamber at a lower capital cost which is capable of processing various different products, and in which the conditions may be changed more readily, and more frequently.

One way in which this may be achieved is by providing a processing chamber in which the conveyor does not move continuously throughout the chamber, but in which it moves in a step-wise fashion, progressively moving individual batches or units of products through the chamber.

Since the batches or units of product will remain stationary, between the step-wise sequence of movement, the chamber can be made much shorter.

In this way, substantial saving in capital cost is obtained.

However, it is still true that even with this modification, the chamber cannot be switched over from processing of one type of product to another until the first type of product has passed completely through the chamber.

Since this may take a considerable time, it means that a substantial delay may be created, by changing over from processing one product to the processing of another.

Accordingly, it is desirable, if possible, to provide for such a chamber in which there are two separate stepwise conveyor systems. In this way, a first batch or unit of product may be moved by one conveyor at a first speed and, as soon as a first zone of the chamber is free of such first batch of product, then a second batch of a different product may be moved into the first zone by a second conveyor, moving it in steps in a different sequence.

In this way, provided the two different products may be processed under the same processing conditions within the various zones, it is possible to process a first of batch of one type of product followed by a second batch of another type of product, with very little down time in the use of the chamber itself.

This means that with a lower capital cost, a small or medium sized processor, may process a variety of different types of product through the oven, with a greatly reduced or minimized down time being created by the changeover from one product to another.

BRIEF SUMMARY OF THE INVENTION

With a view to overcoming these various problems, the invention therefore comprises means defining a continuous chamber for the processing of product, and having a plurality of different chamber zones, and means for establishing different processing conditions in different chamber zones, and including a single continuous conveyor extending through said chamber from one end to the other, and unit support means supportable on such conveyor, for moving product in batches from one end to the other of such chamber, and a first unit movement device, operable at a predetermined first speed to move units through said chamber at said predetermined first speed, and a separate second unit movement device, operable at a predetermined second speed different from said first speed, for moving units through said chamber at said predetermined second speed, and, engagement means interengageable between said unit support means and said first movement means, or said second movement means selectively, whereby a said unit support means can be engaged by either said first movement means or said second movement means, and control means whereby to control said first and second movement means for selective timed operation.

More particularly, it is an objective of the invention to provide such a processing chamber, wherein there are at least two zones, and means for establishing predetermined different processing conditions in each said zone.

More particularly, it is an objective of the invention to provide such a processing chamber, wherein the first and second movement means comprise respective side-by-side puller rods, power operated means for operating said puller rods selectively, abutment means on said puller rods, and movable interlock means on said unit support, being movable between two positions, in one position, being interengagable with said abutment means in one said puller rod, and in the other position being interengageable with said abutment means of the other said puller rod.

It is a further and related objective of the invention to provide such a processing chamber wherein at least one of said zones is provided with a hot water processing system including a circulating pump, heating means for elevating the temperature of the water, a header tank, supplied by said pump with hot water, and openings in said header tank whereby hot water may stream downwardly throughout the area of said zone of said chamber thereby processing units as they dwell in said zones.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 2 is a schematic sectional elevation along the line 2—2 of FIG. 1, showing a first said zone with the roof portion intact;

FIG. 3 is a schematic sectional elevation corresponding to FIG. 2, along the line 3—3 of FIG. 1;

FIG. 4 is a greatly enlarged section along the line 4—4 of FIG. 1;

FIG. 5 is a side elevation of a portion of a puller rod; and

DESCRIPTION OF A SPECIFIC EMBODIMENT

Figure 1:
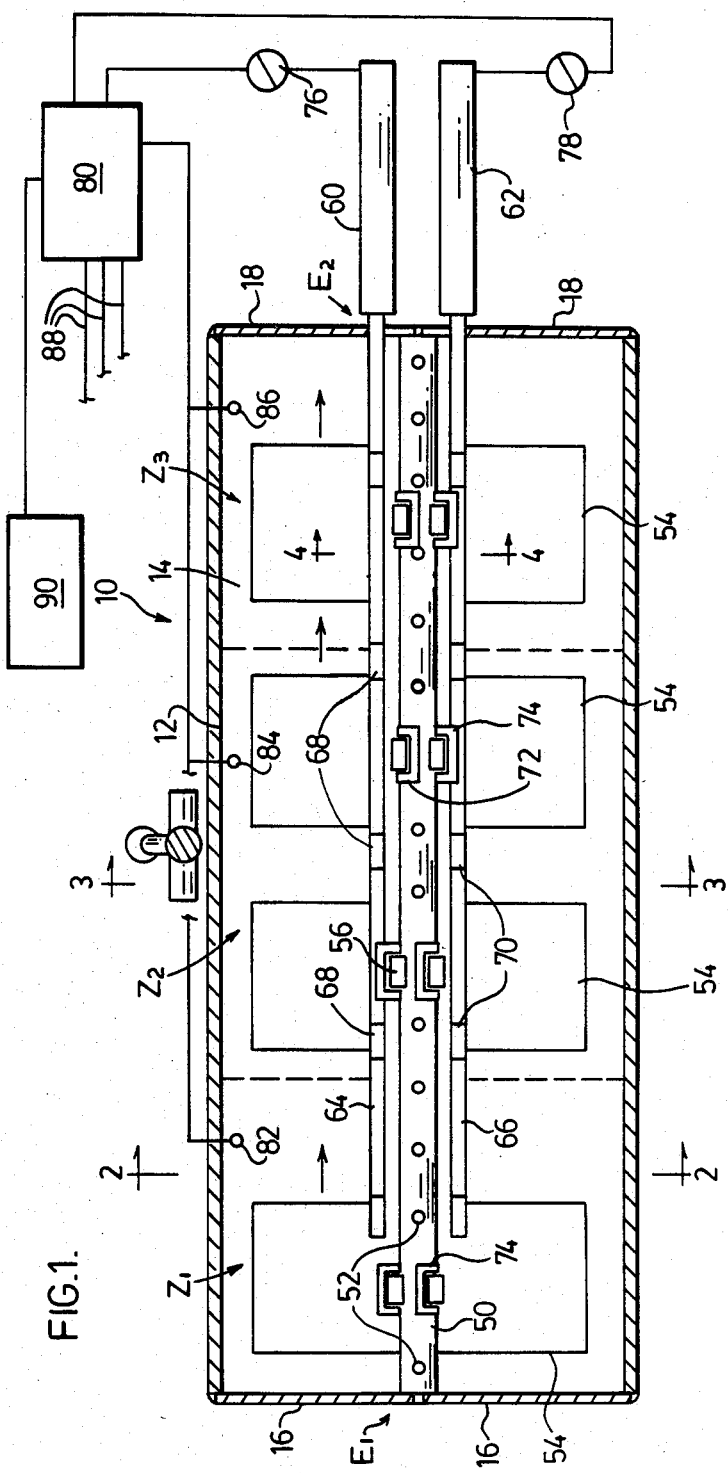
FIG. 1 is a schematic top plan view of a processing chamber according to the invention, shown with the roof portion cut-away.

Processing chambers made in accordance with the invention may be used for processing a variety of different products and goods. For example, many different food products are processed in such chambers, and non-food products such as metal products, earthenware products, and the like may also be processed in chambers in accordance with the invention.

It will of course be understood that the processing conditions in the various zones of the chamber will be determined by the nature of the goods to be treated. Goods may be baked, cured, dried, tempered, smoked, chilled, to give a few examples of the different types of processing conditions that may be used for different types of goods.

In the particular case of the embodiment as illustrated and described herein however, the chamber is designed for the processing of meat and poultry products for the processed meat trade.

All of these products are collectively described "meat products". Examples of these products are sausage of various kinds, hams, picnics, briskets, pork bellies, turkey and chicken rolls, pigs trotters. Various kinds of processed fish such as smoked fish may also be processed in this way.

Some of these products are processed simply by storing them in certain conditions of temperature and humidity for a certain length of time such as for example twenty-four hours. This type of storing process is used in the treatment of typical uncooked sausage such as salami.

Other products are processed simply by a cooking stage followed by a chilling stage.

Other products are processed by first of all smoking, then cooking, and then chilling. Other products may be processed simply by smoking without any cooking or chilling.

Fruit products may also be processed by simply drying them, without cooking or chilling.

Accordingly, therefore, reference will be made generally to food products as having reference to meat, fish and other products any of which may be being processed.

It is also of particular interest that in the present invention, the food products are processed in batches. This means that a large quantity of the products may be assembled together and placed on a series of shelves or hooks or hangers, all of which form part of a single unit. Such a unit may be supported on trolley wheels, on an overhead conveyor rail. Alternatively, it may stand on a set of wheels running on rails on the floor.

For the purposes of this description, therefore, when reference is made to a "unit" it refers to a single product or a number of products, assembled on a suitable support of whatever type may be designed or desired, and which is passed through the chamber as a single collective unit.

This type of processing has several significant advantages over earlier forms of processing chambers. In many earlier forms of processing chambers, an elongated length of tunnel like structure was built, having a conveyor system passing through it which was moving continuously. The conveyor system was provided with hooks at spaced intervals, and individual products or quantities of products were hung from each hook, and moved continuously through the chamber.

Since in order to satisfactorily process any particular product it is necessary that it remain in certain predetermined temperature conditions for a certain length of time, then either the conveyor was run extremely slowly, or else the chamber tunnel would have to be made of very great length. In addition to these obvious disadvantages of the prior art, however, the prior art type of chamber lead to inherent restrictions in the type of products that could be processed through it.

In many cases the processor will wish to process one type of product for say a first shift of the day, and then switch over to a second type of product during a second shift. The two products may require different processing conditions or different dwell times.

In the continuous conveyor type of tunnel chamber, it was necessary to wait until the entire conveyor line was emptied of the first type of products before the conditions in the tunnel could be changed and the new product introduced.

This lead to considerable down time, and rendered any changeover extremely expensive and wasteful.

A further disadvantage which was often encountered in some designs of tunnel like chamber was the difficulty of maintaining strict tolerances on the processing conditions. Since each zone of the tunnel was of great length, it would be necessary to provide numerous sensing devices throughout the length of each zone, and to provide a large amount of specially designed equipment to maintain the conditions at the preset level throughout the length of the zone.

It has now been found that all of these problems can be substantially reduced if not completely eliminated by adopting the batch process, rather than the continuously moving product line.

In a batch process chamber such as that about to be described herein, a batch of product can be introduced into a zone and then simply left stationary during its processing time in that zone. Once that time is up, that batch can then be moved to the next zone and then simply left to stand in the next zone and so on.

This means that the overall chamber structure can be made much shorter and can have greater cross-sectional dimensions. Each batch of product can be assembled as a unit on a single support of considerable size. All products in that batch will be processed simultaneously in absolutely identical conditions, leading to much greater uniformity in the quality of the end product.

Since the zones are more compact, the processing conditions can be maintained to closer tolerances, and the design of the equipment in each zone can be made much more efficient.

Since any one batch of product will be removed from one zone, and placed in another as a single unit, and since the supporting devices for the batches are separate and unconnected with one another, this means that it is much easier to change over from one type of product to another, while a first type of product is still in the chamber.

Much greater flexibility and more efficient operation is achieved, with a much smaller capital investment.

Referring now to FIG. 1, a chamber according to the invention is illustrated schematically as 10. The chamber has three zones indicated as Z1, Z2 and Z3, and product moves from left to right, from the point marked E1, indicating the entry to the point E2, indicating the exit.

The chamber 10 is formed with continuous side walls 12, a floor 14, entry doors 16 and exit doors 18. Typically, the walls 12 would be insulated and the doors 16 and 18 would normally be insulated as well, and the doors would of course be movable to open and close in any suitable manner either by hinging or by sliding.

Alternatively, in some designs it may be possible to utilize air curtain doors of known design (not shown for the sake of clarity) to replace the doors 16 and 18.

Referring to FIGS. 2 and 3, a continuous roof 20 is shown, and attached beneath the roof 20, processing condition apparatus is located which of course will vary from zone to zone and from process to process.

Thus in FIG. 2, the processing condition equipment in zone Z1 will be seen to comprise a fan 22 driven by a motor 24, and operating adjacent to a baffle or false ceiling 25. The ceiling 25 has a central opening 26, and defines side openings 28—28, which may be provided with suitable air director blades or the like of known design.

Air driven by fan 22 will exit through exits 29, and pass downwardly through the zone and return upwardly through the central opening 26, in a continuous recirculating path.

In this way, the entire zone can be continuously and entirely ventilated.

Typically the air in the zone will be treated in some way, or tempered, by tempering units 30. The tempering units 30 may heat the air, chill the air, or may control the humidity either by raising it or lowering it, or may introduce various kinds of artificial smoke for flavouring the product.

The details of such tempering units are well known in the art and require no further description.

In the present case they will typically represent smoke generators, for introducing artificial smoke into the air circulating, for the purpose of establishing a smoking and curing atmosphere in zone Z1.

As explained above, however, the tempering units 30 could be of such a type that they provide different atmospheres in zone Z1, and are therefore shown here purely as a schematic illustration and without limitation.

As shown in FIG. 3, zone Z2 is shown, merely by way of illustration, and without limitation, as be provided with a hot water treatment system comprising a header tank 32, arranged beneath the roof 20, and provided with a plurality of drain holes 34. The zone Z2 has a floor indicated as F which is formed with a slope, so as to provide a collector well 36.

A recirculating pump 38 is connected by means of pipes 40 to well 36. The output from the pump 38 supplies main pipe 42 and branch pipe 44. Main pipe 42 leads back through roof 20 to supply water to header tank 32. Branch pipe 44 passes a proportion of the water through a heat exchanger 46. In this way, a constant flow of hot water at an elevated temperature is supplied to tank 32 and will then pour or stream downwardly through the multiple openings 34 throughout the region of zone Z2 and collect again in well 36.

This so-called water processing system therefore enables a processor to subject products in zones Z2 to heating or chilling, depending upon the type of process and the type of product.

As a cooking or heating medium for food products such as processed meats it is particularly advantageous, since the use of a massive recirculating system such as this with a relatively low pressure, high volume pump 38, provides for a highly efficient method of cooking food products. In particular, the very high volume of water flowing continuously through the zone Z2 ensures that all of the products are raised to the same temperature almost simultaneously, and with a very high degree of temperature control throughout all the products within zone Z2. In fact, it is possible to ensure that there will be a temperature drop in the water temperature between the top of the zone Z2 and the bottom of not more than 1°.

The zone Z3, which is not specifically illustrated in section, may be provided with either an air circulating system such as shown in FIG. 2, or a water circulating system such as shown in FIG. 3, for the purpose of typically chilling products. However, if some other form of processing is required in zone Z3, then it may be provided with an entirely different system for establishing a predetermined zone condition.

In any event, the details of such zone conditioning apparatus are not disclosed, since they may vary widely, and are known to persons skilled in the art.

While three zones are illustrated, the number may vary depending upon the processing conditions, product type and the like.

In order to move batches, or units of product through the zones, a step-wise or batch conveyor system is provided.

Such a conveyor system in this embodiment comprises a single continuous overhead rail 50, suspended in any suitable manner centrally in the upper regions of chamber 10, by means such as posts 52.

The product supports are illustrated merely as cubes 54. In practice, however, these supports will typically be a system of hooks or shelves or racks or the like on which products ready for processing may be supported.

Typically, the supports will be in the form of a cage of rods or bars or the like, and in many cases the products may be first of all arranged in groups or lengths on other supporting devices which are then attached or hooked onto the support device 54. Various different forms of supporting means may be used for supporting products. In the particular case of food products such as linked sausage for example, a typical supporting device is shown in U.S. Letters Pat. No. 3,594,858.

The use of such product hangers or supports enables products such as sausage to be assembled from a sausage stuffing machine in loops, of a weight which can be conveniently handled and each hanger with loops of sausage arranged on it would then be placed on suitable hooks in the supporting device 54.

It will of course be appreciated, however that the use of such individual hangers or rods is in no way limiting. Any means can be provided for supporting a wide variety of different products.

The product support 54 will be provided with any suitable form of trolley means such as the trolley 56, which may be for example slid over the ends of the rail 50. Typically it will be provided with some form of antifriction means such as wheels or the like (not shown) so that it may slide relatively easily along the rail.

In order to move the loaded support 54 along the rail 50, two separate movement systems are provided.

Both movement systems in this embodiment are shown as having the same construction, although this would not necessarily be the case in every installation.

In the present embodiment therefore two movement systems will be seen to comprise the air cylinders 60 and 62 mounted side-by-side at the downstream or exit end E2 of the chamber 10. Each cylinder 60 and 62 has an elongated pull rod 64, 66. Clearly, the pull rod 64 of cylinder 60 is connected to a piston (not shown) in cylinder 60 so that operation of cylinder 60 will cause the pull rod 64 to reciprocate one way or the other, and the same is obviously true of pull rod 66 and cylinder 62.

The pull rods 64 and 66 extend throughout almost the entire length of the chamber 10, and are arranged parallel side-by-side with one another on opposite sides of the conveyor rail 50.

Each of the pull rods 64 and 66 is provided with some form of selectively operable interengagement means, for engaging the trolleys 56, or supports 54. In this embodiment it is illustrated as a series of abutment blocks 68, 70. They are formed, in this embodiment, in a generally wedge shape (FIG. 5), to provide a ramp surface, and are located at spaced intervals along the length of each of pull rods 64 and 66.

Each of the trolleys 56 of the support units 54 are provided with movable latching members 72 and 74, which are swingably mounted on the trolleys 56 and may be swung from left to right (FIG. 4).

Preferably, the latching members will be linked together by means not shown to swing in unison.

The swinging movement of the latching means 72 and 74 is such that they will rest on either of rods 68 or 70 in a slightly upwardly angled position.

This is merely one form of interengagement between the trollies, and the puller rods. Other forms of relatively movable interengagement devices could be provided.

Any suitable bearing or support means not shown may be provided at intervals along rods 64,66 so as to ensure that they remain in position adjacent the trolleys 56.

Cylinders 60 and 62 are controlled by valves 76,78 and controller 80. Controller 80 will typically also be linked to zone sensors 82, 84 and 86, for sensing the conditions in the zones.

Controller 80 will also typically be linked to the zone conditioning units, by leads 88. Controller 80 will be supplied with initial information by input console 90.

The details of the controller 88, and zone sensors, condition controls and console are omitted for the sake of clarity, and may vary widely from one unit to another and are in any event well known to persons skilled in the art.

A further puller rod 92, and cylinder (not shown) may be provided for engaging supports 54 in the downstream zones 22, 23, etc. This enables the operator to effect a change over somewhat more expeditiously.

The engagement means and cylinder are omitted for the sake of clarity.

In operation, assuming it is desired to for example process a food product such as one type of sausage for a first shift, and then change over to a second type of product such as for example a luncheon meat for another shift, then the necessary program information for the first product is input at console 90 into controller 80, and the zone conditions in the zones Z1, Z2 and Z3 are established and stabilized.

The appropriate sausage product is then loaded onto a unit support 54, which is then placed on the rail 50 at the zone entry E1. The loaded support 54 is then pushed into zone Z1 or may simply be pulled in by the operation of the cylinder 60 in the manner described below.

As soon as the batch support 54 has been introduced into the zone Z1, the doors 16 are closed and the operator signals to the controller 80 that processing has commenced on the first batch.

It is assumed for the purposes of this discussion that at the introduction of the first batch support 54, the latches 72, 74 have been swung to the right as shown in FIG. 4.

As a result of its programmed information, the controller 80 will then operate valve 78 to cause cylinder 62 to cycle at a certain number of cycles per hour.

This may be one cycle per hour or two for example. Once the batch support 54 has been stationed in the first zone Z1 the appropriate length of time, the cylinder 62 is then cycled once. This causes the pull rod 66 to be extended and then retracted.

Upon the extension of the pull rod 66, the abutment 70 will move underneath the latch 74. The latch 74 will simply slide up over the ramp of the abutment 70 and then drop down again.

The rod 66 will then be retracted, and this will then cause the first batch support 54 to move the length of one cycle of the rod 66.

Again, depending upon the variables of the processing required, it may be desired to move the batch 54 completely out of the zone Z1 at that point and have it introduced into zone Z2. This may for example require two cycles of the rod 66, and its cylinder 62 before the batch 54 has moved from the zone Z1 to the zone Z2.

Alternatively, the program may be such that a longer dwell time is required in zone Z1 in which case the program will call for a single cycle of the rod 66, which will then merely cause the batch support 54 to move from the first position to a second position within zone Z1.

Again, it will be apparent that there are many variables to be considered including the length of the zones, the size of the batches, the program for the processing conditions for the particular type of product, and even the engineering of the entire installation including the length of the cylinders 60 and 62.

In any event, however, once the first unit support 54 has been moved, the second unit support loaded with product can then be introduced once more by simply opening the doors 16 and placing its trolley 56 on the rail 50.

Again, assuming the products are the same, as they were on the previous batch, then the latches 72,74 will be swung to the same side.

As each fresh loaded batch support 54 is hooked onto the rail, assuming the products are all identical and require identical processing conditions, then all of the latches 72,74 will be swung to the same side.

When it is desired to process a second product requiring different processing dwell times, or indeed different processing conditions within the zones, then the next batch support 54 loaded with the second type of product is raised and attached on the rail 50, but in this case the latches 72,74 are swung to the left.

This will bring them into juxtaposition with the rod 64, operated by the cylinder 60. By inputting the appropriate program information through console 90, the controller 80 will then, through valve 76, cycle cylinder 60 at the appropriate time.

In this way, while the batches of or units of the first product are gradually clearing from the chamber 10, batches or units of the second product can be introduced, with a minimum of down time and delay.

Obviously, in some cases it will be necessary to allow a somewhat larger space along the rail 50 between the last batch of the old product and the first batch of the new product, and in other cases little or no spacing will be required.

For example, where the second type of product requires different processing conditions, then conditions in one or more of the zones must be changed. This will involve allowing all of the first product to move out of the zone to be changed. Then the new process conditions may be input into the controller. Then there will be a certain delay while the new conditions are stabilized.

The batches, or units, of the second product can then be introduced and processed under the new conditions.

It will thus be seen that by the practice of the invention, products of two different types may be processed in the same overall chamber facility, while carried on the same single conveyor line, under different processing conditions or dwell times within the processing conditions in the various zones of the chamber.

It will of course be appreciated that while the invention is illustrated as showing an overhead conveyor rail and suspended product supports 54, the invention is equally applicable to a system of floor rails (not shown) and product supports mounted on wheels which run on such rails.

In this case, of course, the two conveyor systems would be moved and operate at a different location, but the invention would be equally applicable to this type of operation.

While zone Z1 is shown as having an air circulation system and zone Z2 is shown with a water system, the invention is not limited only to these systems, nor to this configuration of systems. Two, three or more zones could all have air, or water systems, or a combination of systems in any order.

Conceivably any one zone can be engineered to incorporate both air and water systems to be used selectively for greater flexibility.

Other conditioning systems such as steam systems, radiant systems, ultra violet treatments and the like may be provided for special applications.

While reference has been made herein to two movement means, it will be appreciated that this is merely one way in which the objectives of the invention can be achieved.

Any means whereby different batches of product can be selectively moved in the chamber at different timings may be used without departing from the invention. Thus for example, the latching devices 72 and 74 may be provided with some form of electrical or mechanical operation and controller.

In this way, the latches could be raised out of engagement, and then lowered into position only when it was required for that particular batch of product to move.

In this way one of the cylinders 60 or 62 and its associated puller rod could be dispensed with altogether. At the same time, one or other of the latches 72–74 could also be dispensed with.

Figure 6:
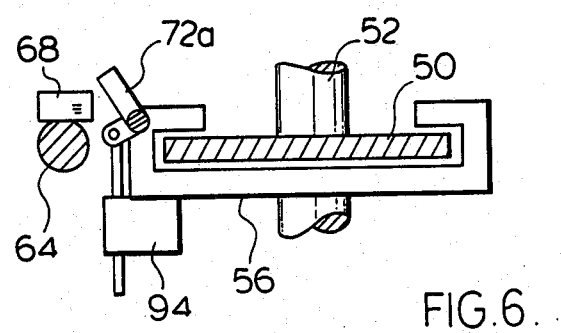
FIG. 6 shows an alternate embodiment.

A general arrangement of such a system is shown in FIG. 6. In this illustration, it will be seen that there is only one puller rod 64, and cylinder 60, and one latch 72a. The latch 72a is operated by a remote controlled electrical operator box 94, which may be operated under the control of controller 80, to swing the latching device 72a to and fro into and out of engagement with the ramp 68 on rod 64.

Alternatively, the operating box 94 may be operated by air controls, or magnetic impulses.

It will thus be appreciated that the invention is not restricted solely to the use of two separate movement means.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. Processing apparatus for processing products in units and comprising:
    chamber means defining a plurality of chamber zones;
    means for establishing predetermined processing conditions in different chamber zones;
    continuous conveyor means extending through said chamber zones and defining a single conveyor axis;
    unit support means supportable on said conveyor means at spaced intervals, for moving units through said chamber zones;
    unit movement means operable in steps at predetermined time intervals to move a first unit along said axis of said conveyor means at predetermined first time intervals; and being further operable to move a second unit along the same said axis of said conveyor means at predetermined second time intervals;
    engagement means selectively interengageable between said unit support means and said movement means, whereby a said unit support means can be engaged and moved either at said first, or at said second time intervals, and,
    control means whereby to control said movement means for selective timed operation.

2. Processing apparatus as claimed in claim 1 wherein there are at least two said zones, each said zone having means for establishing a predetermined processing condition in said zone.

3. Processing apparatus as claimed in claim 1 wherein there are separate first and second movement means, said first movement means being interengageable with said engagement means to move a first unit at said first time intervals, and said second movement means being interengageable with said engagement means of a second unit to move said second unit at said second time intervals.

4. Processing apparatus as claimed in claim 3 wherein the first and second movement means comprise respective side-by-side puller rods, power operated means for operating said puller rods selectively, abutment means on said puller rods, and interlock means on said unit supports said abutment means and said interlock means being relatively movable between two positions, in one position, for interengagement with said abutment means in one said puller rod, and in the other position for interengagement with said abutment means of the other said puller rod.

5. Processing apparatus as claimed in claim 1 wherein at least one of said zones is provided with a hot water processing means whereby hot water may be directed downwardly in streams around a unit of product in said zone in a continuous recirculating hot water flow path.

6. Processing apparatus as claimed in claim 5 wherein said hot water processing system includes a circulating pump, heating means for elevating the temperature of the water, a header tank in an upper region of said zone, supplied by said pump with hot water, and openings in said header tank whereby hot water may stream downwardly throughout the area of said zone of said chamber thereby processing a unit as it dwells in said zone, and collector means in a lower region of said zone for collecting said water, and supplying said pump.

7. Processing apparatus as claimed in claim 1 including condition sensing means in each said zone, means connecting said sensing means to said controller, and means connecting said processing condition means to said controller.

8. Processing apparatus as claimed in claim 1 including a single unit movement means, for moving all said units, abutment means at spaced intervals along said unit movement means, and releasable latching means on said unit support means, and operating means for operating said releasable latching means selectively, whereby a said latching means may be inter-engaged with abutment means on said unit movement means, and released therefrom, as desired.

* * * * *